US012343819B2

(12) United States Patent
Xu et al.

(10) Patent No.: US 12,343,819 B2
(45) Date of Patent: Jul. 1, 2025

(54) FLUX-CORED WELDING STRIP AND WELDING FLUX USED IN COMBINATION FOR SUBMERGED ARC WELDING OF DUPLEX STAINLESS STEEL, AND PREPARATION METHODS AND USE THEREOF

(71) Applicant: HARBIN WELDING INSTITUTE LIMITED COMPANY, Harbin (CN)

(72) Inventors: Kai Xu, Harbin (CN); Pengbo Wu, Harbin (CN); Xiao Guo, Harbin (CN); Wei Feng, Harbin (CN); Shubin Huo, Harbin (CN); Shaowei Chen, Harbin (CN); Bo Chen, Harbin (CN); Hanmin Wu, Harbin (CN); Yiming Ma, Harbin (CN); Laibo Sun, Harbin (CN); Chao Wei, Harbin (CN); Naiwen Fang, Harbin (CN)

(73) Assignee: HARBIN WELDING INSTITUTE LIMITED COMPANY, Harbin (CN)

( * ) Notice: Subject to any disclaimer, the term of this patent is extended or adjusted under 35 U.S.C. 154(b) by 0 days.

(21) Appl. No.: 18/893,935

(22) Filed: Sep. 23, 2024

(65) Prior Publication Data
US 2025/0010410 A1 Jan. 9, 2025

Related U.S. Application Data

(63) Continuation of application No. PCT/CN2023/134529, filed on Nov. 28, 2023.

(30) Foreign Application Priority Data

Feb. 7, 2023 (CN) .......................... 202310072834.2

(51) Int. Cl.
B23K 35/02 (2006.01)
B23K 9/18 (2006.01)
(Continued)

(52) U.S. Cl.
CPC .......... *B23K 35/0266* (2013.01); *B23K 9/186* (2013.01); *B23K 35/3086* (2013.01);
(Continued)

(58) Field of Classification Search
CPC ................ B23K 9/186; B23K 35/3086; B23K 35/3602; B23K 35/362; B23K 35/0266;
(Continued)

(56) References Cited

U.S. PATENT DOCUMENTS 6,149,862 A * 11/2000 Gliklad ................ C22C 38/002
420/104

FOREIGN PATENT DOCUMENTS

CN 104690446 A 6/2015
CN 109202330 A 1/2019
(Continued)

OTHER PUBLICATIONS

Machine translation of CN 110153586 (Year: 2019).*
(Continued)

*Primary Examiner* — Chris Q Liu
*Assistant Examiner* — Abigail H Rhue
(74) *Attorney, Agent, or Firm* — CM Law PLLC; Robert C. Klinger

(57) ABSTRACT

Disclosed are a flux-cored welding strip and a welding flux used in combination for submerged arc welding of a duplex stainless steel, and preparation methods and use thereof. The flux-cored welding strip is composed of a stainless steel shell and a flux core powder, the flux core powder consisting of the following components: in percentages by mass, ferrochrome nitride: 0.70% to 1.0%, a chromium powder: 26% to 27%, a nickel powder: 4.5% to 5.5%, a molybdenum powder: 3.7% to 4.2%, a manganese powder: 2.55% to 2.65%, a copper powder: 1.45% to 1.55%, a ferrosilicon powder: 1.1% to 1.2%, a tungsten powder: 1.0% to 1.15%,
(Continued)

a niobium powder: 0.25% to 0.35%, an aluminum powder: 0.35% to 0.55%, a rhenium powder: 0.35% to 0.40%, a lanthanum powder: 0.1% to 0.15%, and a balance being an iron powder.

10 Claims, 3 Drawing Sheets

(51) Int. Cl.
  *B23K 35/30* (2006.01)
  *B23K 35/36* (2006.01)
  *B23K 35/362* (2006.01)
  *C22C 38/00* (2006.01)
  *C22C 38/02* (2006.01)
  *C22C 38/04* (2006.01)
  *C22C 38/06* (2006.01)
  *C22C 38/42* (2006.01)
  *C22C 38/44* (2006.01)
  *C22C 38/48* (2006.01)
  *C22C 38/58* (2006.01)

(52) U.S. Cl.
  CPC ........ *B23K 35/3602* (2013.01); *B23K 35/362* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/42* (2013.01); *C22C 38/44* (2013.01); *C22C 38/48* (2013.01); *C22C 38/58* (2013.01)

(58) Field of Classification Search
  CPC ... C22C 38/001; C22C 38/002; C22C 38/005; C22C 38/02; C22C 38/04; C22C 38/06; C22C 38/42; C22C 38/44; C22C 38/48; C22C 38/58

USPC ....... 219/137 WM, 126, 16, 12 R, 137, 136, 219/74, 137.42
  See application file for complete search history.

(56) References Cited

FOREIGN PATENT DOCUMENTS

| | | | | |
|---|---|---|---|---|
| CN | 110153586 A | * | 8/2019 | ......... B23K 35/0266 |
| CN | 110653520 A | | 1/2020 | |
| CN | 110900033 A | * | 3/2020 | ......... B23K 35/0266 |
| CN | 111037155 A | * | 4/2020 | |
| CN | 114589429 A | * | 6/2022 | |
| CN | 114734162 A | | 7/2022 | |
| CN | 115466902 A | * | 12/2022 | |
| CN | 116372417 A | | 7/2023 | |
| JP | 2010188387 A | | 9/2010 | |
| JP | 2018130762 A | | 8/2018 | |

OTHER PUBLICATIONS

Machine translation of CN110900033 (Year: 2019).*
Machine translation of CN111037155 (Year: 2019).*
Machine translation of CN 114589429 (Year: 2022).*
Machine translation of CN115466902 (Year: 2022).*
First Office Action received in Chinese Application No. 202310072834.2, mailed Sep. 11, 2023.
Notification to Grant Patent Right for Invention received in Chinese Application No. 2023100728343.2, mailed Oct. 11, 2023.
International Search Report received in Patent Cooperation Treaty Application No. PCT/CN2023/134529, mailed Mar. 2, 2024.

* cited by examiner

FLUX-CORED WELDING STRIP AND WELDING FLUX USED IN COMBINATION FOR SUBMERGED ARC WELDING OF DUPLEX STAINLESS STEEL, AND PREPARATION METHODS AND USE THEREOF

CROSS REFERENCE TO RELATED APPLICATION

The present application is a continuation application of International Patent Application No. PCT/CN2023/134529, filed on Nov. 28, 2023, which claims priority to Chinese Patent Application No. 2023100728342, entitled "Flux-cored welding strip and welding flux used in combination for submerged arc welding of duplex stainless steel, and preparation methods and use thereof", and filed with the China National Intellectual Property Administration on Feb. 7, 2023. The disclosure of the two applications is incorporated by references herein in their entireties as part of the present application.

TECHNICAL FIELD

The present disclosure belongs to the technical field of welding materials, and specifically relates to a flux-cored welding strip and a welding flux used in combination for submerged arc welding of a duplex stainless steel, and preparation methods and use thereof.

BACKGROUND

Duplex stainless steels are a key special steel type for development of the iron and steel industry in China. Duplex stainless steels have a duplex structure of ferrite and austenite, and thus exhibit both the excellent toughness of an austenitic stainless steel and the high strength and chloride ion corrosion resistance of a ferritic stainless steel. In recent years, duplex stainless steels have been more and more widely used in fields such as marine structures, petrochemical industry, and freshwater purification. In order to reduce cost and improve production efficiency, strip submerged arc cladding welding is often adopted to conduct duplex stainless steel-deposited cladding on inner surfaces of tube plates of a hydrogenation reactor and a heat exchanger to improve the corrosion resistance of these devices.

Although duplex stainless steels have a ferrite/austenite duplex structure and exhibit excellent mechanical performance and corrosion resistance, an internal stress of a cladding layer metal increases due to a large heat input of strip submerged arc cladding welding. A duplex stainless steel cladding layer would undergo stress-corrosion cracking under a combined action of a complicated corrosive environment and a tension stress, which may cause a catastrophic accident because stress corrosion is usually difficult to detect, thereby causing a heavy economic loss. A stress-corrosion mechanism of duplex stainless steels mainly lies in the following four aspects: (1) Electrochemical anodic dissolution theory: A microcrack tip anode is rapidly dissolved, and the dissolution of the anode is accelerated under a stress, resulting in separation of a metal. (2) Hydrogen embrittlement mechanism: hydrogen-induced cracks are easy to occur along a phase interface of a duplex stainless steel, such that the dissolution of an anode is accelerated under a stress, resulting in separation of a metal. (3) Film rupture theory: a surface protective film of a duplex stainless steel is destroyed and a matrix metal is exposed, the matrix metal would be corroded and dissolved when be in contact with a corrosive medium. (4) Matrix low-strength theory: When a surface protective film of a duplex stainless steel is destroyed and becomes a crack source, a low strength of a matrix cannot effectively prevent the further expansion of cracks, resulting in an instantaneous fracture of a cladding layer. Therefore, it is extremely important to develop a duplex stainless steel welding strip/wire with high stress-corrosion resistance to reduce the occurrence of stress-corrosion cracking accidents and ensure the safety of production.

SUMMARY

In order to solve the technical problem of poor stress-corrosion resistance of a cladding deposited metal existing in ferrite-austenite duplex stainless steel during strip submerged arc cladding welding, the present disclosure provides a flux-cored welding strip and a welding flux used in combination for submerged arc welding of a duplex stainless steel, and preparation methods and use thereof.

A first object of the present disclosure is to provide a flux-cored welding strip for submerged arc welding of a duplex stainless steel, including/being composed of a stainless steel shell and a flux core powder, wherein the flux core powder includes/consists of the following components in percentages by mass, ferrochrome nitride: 0.70% to 1.0%, a chromium powder: 26% to 27%, a nickel powder: 4.5% to 5.5%, a molybdenum powder: 3.7% to 4.2%, a manganese powder: 2.55% to 2.65%, a copper powder: 1.45% to 1.55%, a ferrosilicon powder: 1.1% to 1.2%, a tungsten powder: 1.0% to 1.15%, a niobium powder: 0.25% to 0.35%, an aluminum powder: 0.35% to 0.55%, a rhenium powder: 0.35% to 0.40%, a lanthanum powder: 0.1% to 0.15%, and a balance being an iron powder.

In some embodiments, the stainless steel shell is an S32750 duplex stainless steel strip, has a thickness of 0.5 mm to 0.6 mm, and includes/consists of the following elements: in percentages by mass, Cr: 24.0% to 26.0%, Ni: 6.0% to 8.0%, Mo: 3.0% to 5.0%, Mn: less than or equal to 1.2%, C: less than or equal to 0.03%, Si: less than or equal to 0.8%, Cu: less than or equal to 0.50%, N: 0.24% to 0.32%, S: less than or equal to 0.02%, P: less than or equal to 0.035%, and a balance being Fe.

A second object of the present disclosure is to provide a method for preparing the flux-cored welding strip for submerged arc welding of the duplex stainless steel as described above, including the following steps or being as follows:

step 1: pickling the stainless steel shell to obtain a pickled stainless steel shell;

step 2: mixing powders of raw materials for the flux core powder for 1 h to 2 h under argon protection to obtain a mixed powder, and oven-drying the mixed powder to obtain the flux core powder; and step 3: bending the pickled stainless steel shell for shaping, loading the flux core powder therein, and rolling, to obtain the flux-cored welding strip for submerged arc welding of the duplex stainless steel.

In some embodiments, in step 1, a solution for the pickling is an aqueous solution of 30 vol % $H_2SO_4$+17 vol % $HNO_3$+4.5 vol % HF.

In some embodiments, in step 2, the oven-drying is conducted at a temperature of 100° C. to 150° C. for 0.5 h to 1 h.

A third object of the present disclosure is to provide a welding flux used in combination with the flux-cored welding strip as described above, for submerged arc welding of the duplex stainless steel, including/consisting of the following components: in percentages by mass, bauxite: 20% to 25%, a clay: 5% to 10%, a zircon sand: 10% to 15%, a magnesite clinker: 10% to 15%, fluorite: 25% to 30%, an alloying agent: 1.5% to 2%, and a balance being chromium oxide green.

In some embodiments, the alloying agent is a W—Nb—Al—Re—La alloy that includes W: 0.3% to 0.4%, Nb: 0.3% to 0.4%, Al: 0.3% to 0.4%, Re: 0.3% to 0.4%, and La: 0.3% to 0.4%.

A fourth object of the present disclosure is to provide a method for preparing the welding flux for submerged arc welding of the duplex stainless steel as described above, including the following steps or being as follows:

preliminarily screening raw materials for the welding flux, then mixing by stirring, oven-drying a resulting mixture at a low temperature, adding water glass thereto, and further stirring; and granulating a resulting wet material to obtain particles for forming the welding flux, and oven-drying and sintering the particles, to obtain the welding flux for submerged arc welding of a high-manganese low-nickel duplex stainless steel.

In some embodiments, oven-drying the resulting mixture at a low temperature is conducted at a temperature of 150° C. to 200° C. for 30 min to 40 min.

In some embodiments, the sintering is conducted at a temperature of 700° C. to 800° C.

A fifth object of the present disclosure is to provide use of the flux-cored welding strip and the welding flux used in combination for strip submerged arc cladding welding, wherein a deposited metal of a cladding layer after welding includes/consists of the following chemical components: in percentages by mass, C: 0.15% to 0.25%, N: 0.30% to 0.50%, Cr: 26.0% to 27.0%, Ni: 4.0% to 5.0%, Mo: 3.5% to 4.0%, Mn: 2.45% to 2.55%, Cu: 1.4% to 1.5%, Si: 0.95% to 1.05%, W: 0.9% to 1.1%, Nb: 0.2% to 0.3%, Al: 0.3% to 0.5%, Re: 0.25% to 0.35%, La: 0.05% to 0.10%, S: less than or equal to 0.02%, P: less than or equal to 0.03%, and a balance being Fe.

Compared with the prior art, some embodiments of the present disclosure has the following advantages:

In the present disclosure, alloy element contents in the welding strip and the welding flux are comprehensively regulated, and the synergistic control of the welding strip and the welding flux is adopted to ensure excellent weld seam formation to obtain a weld seam having a smooth surface without microcracks and eliminate a crack source of a surface of a weld seam. In addition, a passivation film on a surface of a duplex stainless steel is strengthened by increasing the thickness, uniformity, and strength of the passivation film to prevent the protective film on the surface of the duplex stainless steel from being destructed. The stress-corrosion resistance of the duplex stainless steel is improved by effectively preventing the further expansion of cracks through grain refinement. Specifically, some embodiments of the present disclosure have the following advantages:

1) In the duplex stainless steel flux-cored welding strip with high stress-corrosion resistance, a pure N alloying mode is replaced by a C+N alloying mode, and a C/N ratio is strictly controlled at 0.4-0.6, such that a concentration of free electrons increases, thereby increasing contents of interstitial elements in an austenitic stainless steel while decreasing a ductile-brittle transition temperature of a duplex stainless steel. With the increase of both C and N contents, a thickness of a ([Cr]/[Cr+Fe]) alloy passivation film formed on a surface of a duplex stainless steel increases, which increases the pitting corrosion resistance of the duplex stainless steel. However, a too-high C+N content would make the corrosion resistance of an austenite greater than the corrosion resistance of a ferrite in a duplex stainless steel, resulting in reduction of local corrosion resistance. Therefore, the C+N content is controlled at 0.45%-0.75%.

2) In the duplex stainless steel flux-cored welding strip with high stress-corrosion resistance, the addition of Cr reduces a passivation current of a duplex stainless steel, maintains the stability of a passivation film in a duplex stainless steel, and improves a destruction repair ability of the passivation film. However, the increase of Cr content would promote the precipitation of an intermetallic compound, thereby reducing the plasticity, toughness, and corrosion resistance of a duplex stainless steel. A Cr content is usually controlled at 22%-27%. However, because the addition of C+N element in the present disclosure increases, a thickness of a ([Cr]/[Cr+Fe]) alloy passivation film formed on a surface of a duplex stainless steel increases, and the content of Cr in the ([Cr]/[Cr+Fe]) alloy passivation film formed on the surface of the duplex stainless steel increases with the increase of C+N alloying. Therefore, the Cr content is controlled at 26%-27% to avoid the phenomenon of Cr depletion.

3) In the duplex stainless steel flux-cored welding strip with high stress-corrosion resistance, Ni could promote the transformation of ferrite into austenite, and with the increase of Ni content, the generation of an intermetallic compound could be effectively inhibited, but the inhibitory effect of Ni is inferior to that of N. In the present disclosure, Ni is added to control a ratio of ferrite to austenite at 1:1. Therefore, the Ni content is controlled at 4.0%-5.0% in the present disclosure.

4) In the duplex stainless steel flux-cored welding strip with high stress-corrosion resistance, Mo added would be enriched in a passivation film close to a matrix, which could significantly improve a strength of the passivation film, and improve the corrosion resistance of the passivation film. However, a too-high Mo content would promote the precipitation of σ phase and increase a brittle tendency of a joint. Therefore, the Mo content is controlled at 3.5%-4.0% in the present disclosure.

5) In the duplex stainless steel flux-cored welding strip with high stress-corrosion resistance, the addition of Mn could reduce a quenching speed in a duplex stainless steel, increase the stability of austenite during cooling, improve a strength and a critical crevice corrosion temperature of a duplex stainless steel, and play a role of deoxidation. However, excess Mn would react with S in a steel to produce a MnS impurity, and the MnS impurity becomes a preferred part of pitting corrosion, which reduces the corrosion resistance of a cladding layer metal. Therefore, the Mn content is controlled at 2.45%-2.55% in the present disclosure.

6) In the duplex stainless steel flux-cored welding strip with high stress-corrosion resistance, the addition of Cu could improve a strength of a cladding layer metal and the stress-corrosion resistance of a duplex stainless steel in NaCl and $MgCl_2$ solutions. However, a too-high Cu content would promote the growth of austenite grains. Therefore, the Cu content is controlled at 1.4%-1.5% in the present disclosure.

7) In the duplex stainless steel flux-cored welding strip with high stress-corrosion resistance, the addition of W would promote the transformation of austenite into ferrite, and with the increase of W content, the corrosion resistance and strength of a cladding layer for duplex stainless steel tend to increase. However, a too-high W content would increase the brittleness of a cladding layer. Therefore, in the present disclosure, the W content is controlled at 0.9%-1.1% to ensure the excellent mechanical performance of a cladding layer.

8) In the duplex stainless steel flux-cored welding strip with high stress-corrosion resistance, 0.2%-0.3% of Nb added could improve the corrosion resistance and meanwhile effectively improve a surface quality of a cladding layer, and 0.3%-0.5% of Al added, 0.25%-0.35% of Re added, and 0.05%-0.1% of La added could significantly refine grains of a duplex stainless steel cladding layer.

9) In welding flux with high stress-corrosion resistance for submerged arc welding of a duplex stainless steel, bauxite, a zircon sand, and a magnesite clinker are reasonably combined to effectively enhance the arc stability, improve the weld seam formation and a surface quality of a weld seam, and prevent a cladding layer metal from forming microcracks. However, a too-high bauxite content would easily cause defects such as slag inclusion, a too-high zircon sand content would increase the difficulty of slag removal and make a surface of a weld seam present oxidized color, and a too-high magnesite clinker content would lead to a rough and pitted surface of a weld seam. Therefore, in the present disclosure, a bauxite content is controlled at 20%-25%, a clay content is controlled at 5%-10%, a zircon sand content is controlled at 10%-15%, and a magnesite clinker content is controlled at 10%-15%.

10) In the welding flux with high stress-corrosion resistance for submerged arc welding of a duplex stainless steel, the addition of fluorite could reduce a content of diffusible hydrogen in a cladding layer, and thus hydrogen-induced cracks appear on a surface of the cladding layer, which reduces the stress-corrosion resistance of the cladding layer. However, a too-high fluorite content would make a slag have a too-large viscosity, such that the slag removability of a surface of a weld seam would be deteriorated to cause oxidation. A W—Nb—Al—Re—La microalloying system is used as an alloying agent to compensate for a burning loss of microalloying elements during welding.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

Figure 1:
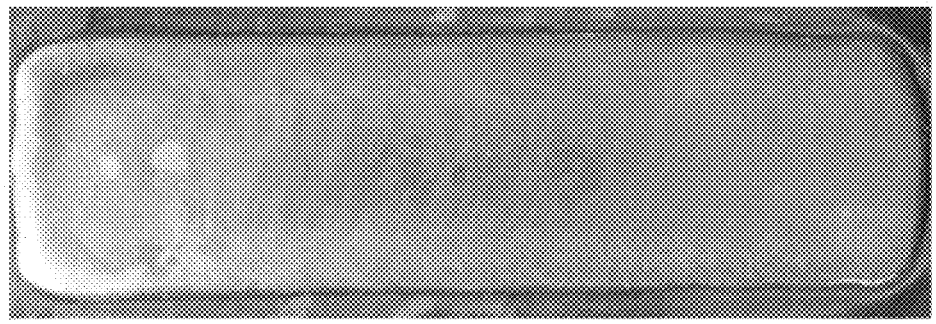
FIG. 1 is a macroscopic morphology image of the cladding deposited layer obtained in Example 1.

To make the objects, technical solutions, and advantages of the present disclosure clearer and understandable, the present disclosure will be further described below in detail in conjunction with examples. It should be understood that the specific examples described herein are intended merely to explain the present disclosure, rather than to limit the present disclosure.

All experimental methods used in the following examples are conventional methods, unless otherwise specified. The materials, reagents, methods, and instruments used all are conventional materials, reagents, methods, and instruments in the art unless otherwise specified, and could be acquired by those skilled in the art through commercial channels.

The terms "include", "comprise", "have", "including", or any other variations thereof used in the following examples refer to non-exclusive inclusion. For example, a composition, step, method, article, or device including listed elements is not necessarily limited to those elements, but may include other elements not explicitly listed or inherent elements in such a composition, step, method, article, or device.

In the text, term "duplex stainless steel" refers to a stainless steel that has a duplex structure of ferrite and austenite.

Particularly, the present disclosure provides use of the flux-cored welding strip and the welding flux used in combination for strip submerged arc cladding welding. The process parameters could be set according to conventional strip submerged arc cladding welding processes. In some embodiments, the use includes covering a surface of a base material with the welding flux as described above;

inserting the flux-cored welding strip as described above as an electrode into the welding flux, and generating an arc between the base material and the electrode after powering; and in the action of arc heat, simultaneously melting the flux-cored welding strip and the welding flux, and then cooling, thereby forming a deposited metal.

When an amount, concentration, or other value or parameter is expressed in a range, a preferred range, or a range defined by a series of upper and lower preferred values, it should be understood that all ranges formed by any pair of an upper limit or preferred value of any range with a lower limit or preferred value of any range are specifically disclosed, regardless of whether the ranges are independently disclosed. For example, when a range of "1 to 5" is disclosed, the described range should be interpreted as including the ranges of "1 to 4", "1 to 3", "1 to 2", "1 to 2 and 4 to 5", "1 to 3 and 5", or the like. When a numerical range is described herein, unless otherwise stated, the range is intended to include its end values and all integers and fractions within the range. In the description and claims of the present disclosure, these ranges may be combined and/or interchangeable, and unless otherwise stated, these ranges include all sub-ranges included in these ranges.

Indefinite articles "a" and "an" before an element or component of the present disclosure have no restriction on a quantity (namely, an occurrence frequency) of the elements or components. Therefore, "a" or "an" shall be construed to include one or at least one, and an element or a component in a singular form also includes a plural form, unless it clearly refers merely to a singular form.

Example 1

In this example, a flux-cored welding strip for submerged arc welding of a duplex stainless steel was provided, consisting of a stainless steel shell and a flux core powder, wherein the flux core powder was composed of the following components: in percentages by mass, ferrochrome nitride: 0.70%, a chromium powder: 26%, a nickel powder: 4.5%, a molybdenum powder: 3.7%, a manganese powder: 2.55%, a copper powder: 1.45%, a ferrosilicon powder: 1.1%, a tungsten powder: 1.0%, a niobium powder: 0.25%, an aluminum powder: 0.35%, a rhenium powder: 0.35%, a lanthanum powder: 0.1%, and the balance being an iron powder.

The stainless steel shell was an S32750 duplex stainless steel strip, had a thickness of 0.5 mm, and was composed of the following elements: in percentages by mass, Cr: 24%, Ni: 6.0%, Mo: 3.0%, Mn: 1.0%, C: 0.15%, Si: 0.6%, Cu: 0.30%, N: 0.24%, S: 0.01%, P: 0.03%, and a balance being Fe.

The chromium powder, the nickel powder, the molybdenum powder, the manganese powder, the copper powder, and the iron powder each have a granularity of 100 mesh, and the ferrochrome nitride, the ferrosilicon powder, the tungsten powder, the niobium powder, the aluminum powder, the rhenium powder, and the lanthanum powder each have a granularity of 50 mesh.

The flux-cored welding strip for submerged arc welding of a duplex stainless steel was prepared according to the following procedures:

Step 1: the stainless steel shell was pickled with an aqueous solution of 30 vol % $H_2SO_4$+17 vol % $HNO_3$+4.5 vol % HF, obtaining a pickled stainless steel shell.

Step 2: powders of raw materials for the flux-cored welding strip were mixed for 1 h under argon protection, and then oven-dried at 100° C. for 0.5 h, obtaining the flux core powder.

Step 3: the pickled stainless steel shell was bent for shaping, the flux core powder was loaded therein, and rolling was then conducted, obtaining the flux-cored welding strip with a width of 29.5 mm and a thickness of 1.5 mm for submerged arc welding of a duplex stainless steel.

A welding flux used in combination with the flux-cored welding strip for submerged arc welding of a duplex stainless steel was provided, being composed of the following components: in percentages by mass, bauxite: 20%, a clay: 5%, a zircon sand: 10%, a magnesite clinker: 10%, fluorite: 25%, an alloying agent: 1.7%, and the balance being chromium oxide green, wherein the alloying agent was a W—Nb—Al—Re—La alloy that included: W: 0.3%, Nb: 0.4%, Al: 0.3%, Re: 0.4%, and La: 0.3%.

The welding flux was prepared according to the following procedures:

Firstly, powders of above raw materials for the welding flux were preliminarily screened separately to obtain those having a granularity of 30 mesh, and then mixed by stirring. The resulting mixture was oven-dried at 150° C. for 30 min, obtaining a dry material.

Secondly, water glass was added to the dry material, and the resulting mixture was further stirred, obtaining a wet material.

Thirdly, the wet material was granulated, obtaining welding flux particles, and the welding flux particles were oven-dried at 150° C. and then sintered at 700° C. for 40 min, obtaining the welding flux for submerged arc welding of a duplex stainless steel.

Use Example 1: The flux-cored welding strip for submerged arc welding of a duplex stainless steel and the welding flux for submerged arc welding of a duplex stainless steel in Example 1 were used in combination for strip submerged arc cladding welding with welding process parameters shown in Table 1.

TABLE 1

| Welding process parameters | | | | |
|---|---|---|---|---|
| Power polarity | Cladding current/A | Cladding voltage/V | Cladding speed/mm/min | Interpass temperature/° C. |
| Direct current reverse polarity | 800 | 32 | 300 | 150 |

Results: A deposited metal of a cladding layer formed after cladding had the following chemical components: in percentages by mass, C: 0.15%, N: 0.30%, Cr: 26%, Ni: 4.0%, Mo: 3.5%, Mn: 2.45%, Cu: 1.4%, Si: 0.95%, W: 0.9%, Nb: 0.2%, Al: 0.3%, Re: 0.25%, La: 0.05%, S: 0.015%, P: 0.02%, and the balance being Fe.

Figure 2:
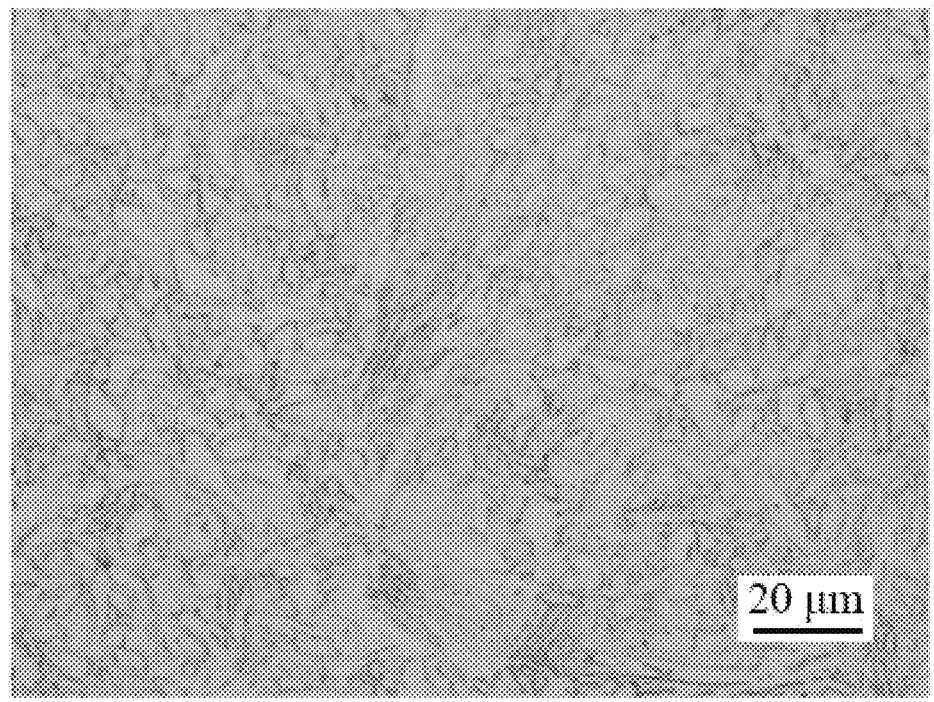
FIG. 2 is a microscopic morphology image of the cladding deposited layer obtained in Example 1.

A macroscopic morphology of the cladding deposited layer is shown in FIG. 1, a microscopic morphology of the cladding deposited layer is shown in FIG. 2, and stress-corrosion resistance of the deposited metal is shown in Table 2.

TABLE 2

| Stress-corrosion resistance of the deposited metal | | |
|---|---|---|
| Corrosive environment | Yield strength, Rp0.2/MPa | Tensile strength, Rm/MPa |
| Example 1 0.1 mol/L $S_2O_3^{2-}$ + 20 wt % NaCl, pH = 4 | 720 | 850 |

It can be seen from FIG. 1 that the cladding layer is beautifully formed, and has no defects such as pores, cracks, incomplete fusion, and oxidation. It can be seen from FIG. 2 that a ferrite and an austenite are distributed in equal proportions, and weld seam grains are significantly refined.

Example 2

In this example, a flux-cored welding strip for submerged arc welding of a duplex stainless steel was provided, consisting of a stainless steel shell and a flux core powder, wherein the flux core powder was composed of the following components: in percentages by mass, ferrochrome nitride: 1.0%, a chromium powder: 27%, a nickel powder: 5.5%, a molybdenum powder: 4.2%, a manganese powder: 2.65%, a copper powder: 1.55%, a silicon powder: 1.2%, a tungsten powder: 1.15%, a niobium powder: 0.35%, an aluminum powder: 0.50%, a rhenium powder: 0.40%, a lanthanum powder: 0.15%, and the balance being an iron powder.

The stainless steel shell was an S32750 duplex stainless steel strip, had a thickness of 0.6 mm, and was composed of the following elements: in percentages by mass, Cr: 26%, Ni: 8.0%, Mo: 5.0%, Mn: 0.8%, C: 0.015%, Si: 0.75%, Cu: 0.45%, N: 0.32%, S: 0.01%, P: 0.02%, and the balance being Fe.

The chromium powder, the nickel powder, the molybdenum powder, the manganese powder, the copper powder, and the iron powder each have an average granularity of 120 mesh; and the ferrochrome nitride, the ferrosilicon powder, the tungsten powder, the niobium powder, the aluminum powder, the rhenium powder, and the lanthanum powder each have an average granularity of 60 mesh.

The flux-cored welding strip for submerged arc welding of a duplex stainless steel was prepared according to the following procedures:

Step 1: the stainless steel shell was pickled with an aqueous solution of 30 vol % H$_2$SO$_4$+17 vol % HNO$_4$+4.5 vol % HF, obtaining a pickled stainless steel shell.

Step 2: powders of raw materials for the flux-cored welding strip were mixed for 2 h under argon protection, and then oven-dried at 150° C. for 1 h, obtaining the flux core powder.

Step 3: the pickled stainless steel shell was bent for shaping, the flux core powder was loaded, and rolling was then conducted, obtaining the flux-cored welding strip with a width of 30.5 mm and a thickness of 2 mm.

A welding flux used in combination with the flux-cored welding strip for submerged arc welding of a duplex stainless steel was provided, having the following components: in percentages by mass, bauxite: 25%, a clay: 10%, a zircon sand: 15%, a magnesite clinker: 15%, fluorite: 30%, an alloying agent: 1.9%, and the balance being chromium oxide green. The alloying agent was a W—Nb—Al—Re—La alloy that included: W: 0.5%, Nb: 0.3%, Al: 0.4%, Re: 0.3%, and La: 0.4%.

The welding flux was prepared according to the following procedures:

Firstly: powders of above raw materials for the welding flux were preliminarily screened to obtain those having a granularity of 40 mesh, and then mixed by stirring. The resulting mixture was oven-dried at 200° C. for 40 min, obtaining a dry material.

Secondly: water glass was added to the dry material, and the resulting mixture was further stirred, obtaining a wet material.

Thirdly: the wet material was granulated, obtaining welding flux particles, and the welding flux particles were oven-dried at 200° C. and then sintered at 800° C. for 50 min, obtaining the welding flux for submerged arc welding of a duplex stainless steel.

Use Example 2: The flux-cored welding strip for submerged arc welding of a duplex stainless steel and the welding flux for submerged arc welding of a duplex stainless steel in Example 2 were used in combination for strip submerged arc cladding welding with welding process parameters shown in Table 3.

TABLE 3

Welding process parameters

| Power polarity | Cladding current/A | Cladding voltage/V | Cladding speed/mm/min | Interpass temperature/° C. |
|---|---|---|---|---|
| Direct current reverse polarity | 700 | 30 | 350 | 100 |

Results: a deposited metal of a cladding layer formed after cladding has the following chemical components: in percentages by mass, C: 0.25%, N: 0.50%, Cr: 27%, Ni: 5%, Mo: 4.0%, Mn: 2.55%, Cu: 1.5%, Si: 1.05%, W: 1.1%, Nb: 0.3%, Al: 0.5%, Re: 0.35%, La: 0.1%, S: 0.01%, P: 0.015%, and the balance being Fe.

Figure 3:
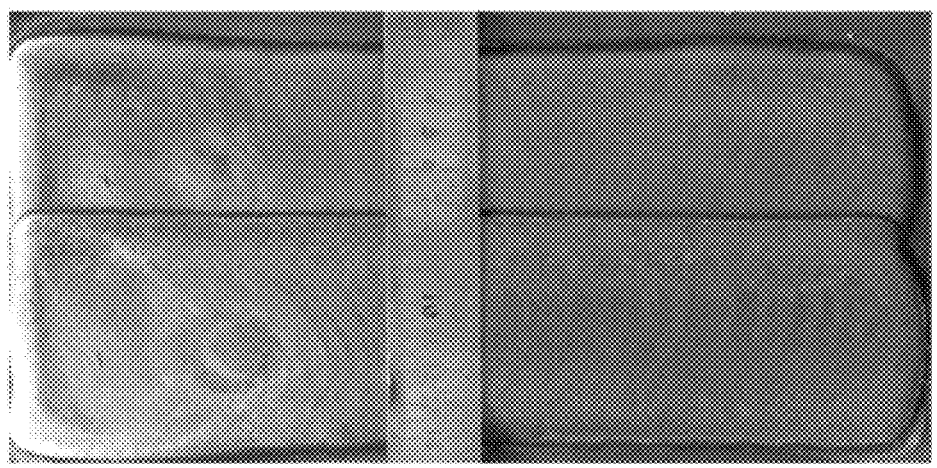
FIG. 3 is a macroscopic morphology image of the cladding deposited layer obtained in Example 2.
Figure 4:
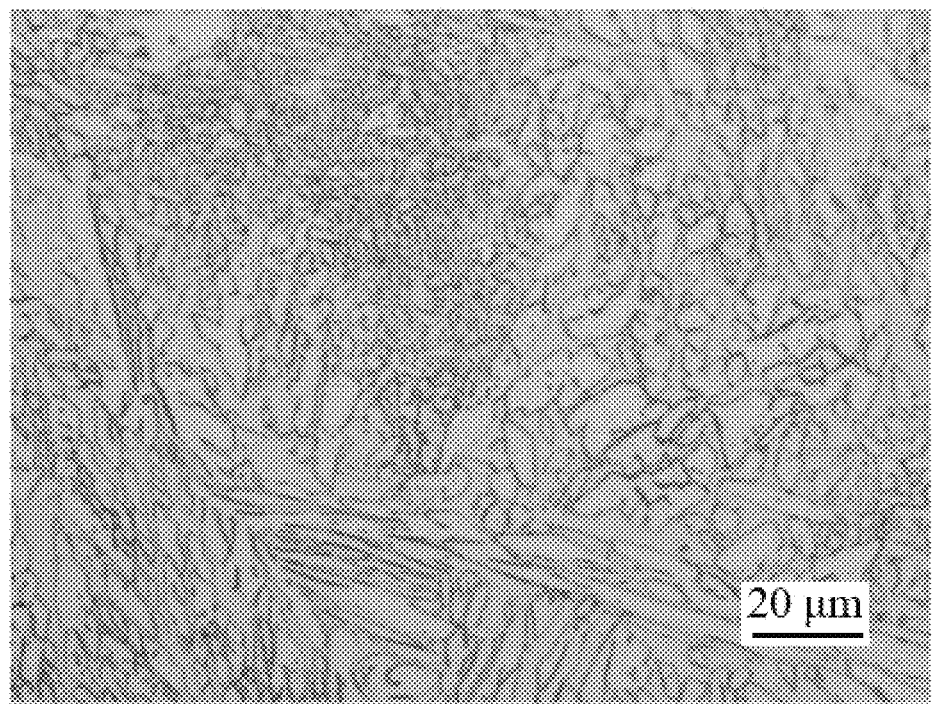
FIG. 4 is a microscopic morphology image of the cladding deposited layer obtained in Example 2.

A macroscopic morphology of the cladding deposited layer is shown in FIG. 3, a microscopic morphology of the cladding deposited layer is shown in FIG. 4, and stress-corrosion resistance of the deposited metal is shown in Table 4.

TABLE 4

Stress-corrosion resistance of the deposited metal

| | Corrosive environment | Yield strength, Rp0.2/MPa | Tensile strength, Rm/MPa |
|---|---|---|---|
| Example 1 | 0.1 mol/L S$_2$O$_3^{2-}$ + 20 wt % NaCl, pH = 4 | 740 | 875 |

It can be seen from FIG. 3 that the cladding layer is beautifully formed, and has no defects such as pores, cracks, incomplete fusion, and oxidation. It can be seen from FIG. 4 that a ferrite and an austenite are distributed in equal proportions, and weld seam grains are significantly refined.

Specific examples are used for illustration of the principles and embodiments of the present disclosure. The description of the examples is intended to help understand illustrate the method and its core concept of the present disclosure. In addition, those skilled in the art could make various modifications in terms of specific embodiments and scope of application according to the concept of the present disclosure. In conclusion, the content of the present specification shall not be construed as limitations to the present disclosure.

What is claimed is:

1. A flux-cored welding strip and a welding flux used in combination for submerged arc welding of a duplex stainless steel, wherein
    the flux-cored welding strip is composed of a stainless steel shell and a flux core powder, the flux core powder consisting of the following components: in percentages by mass, ferrochrome nitride: 0.70% to 1.0%, a chromium powder: 26% to 27%, a nickel powder: 4.5% to 5.5%, a molybdenum powder: 3.7% to 4.2%, a manganese powder: 2.55% to 2.65%, a copper powder: 1.45% to 1.55%, a ferrosilicon powder: 1.1% to 1.2%, a tungsten powder: 1.0% to 1.15%, a niobium powder: 0.25% to 0.35%, an aluminum powder: 0.35% to 0.55%, a rhenium powder: 0.35% to 0.40%, a lanthanum powder: 0.1% to 0.15%, and a balance being an iron powder; and
    the welding flux consists of the following components: in percentages by mass, bauxite: 20% to 25%, a clay: 5% to 10%, a zircon sand: 10% to 15%, a magnesite clinker: 10% to 15%, fluorite: 25% to 30%, an alloying agent: 1.5% to 2%, and a balance being chromium oxide green.

2. The flux-cored welding strip and the welding flux used in combination for submerged arc welding of the duplex stainless steel as claimed in claim 1, wherein the stainless steel shell is an S32750 duplex stainless steel strip, has a thickness of 0.5 mm to 0.6 mm, and consists of:
    in percentages by mass, Cr: 24.0% to 26.0%, Ni: 6.0% to 8.0%, Mo: 3.0% to 5.0%, Mn: less than or equal to 1.2%, C: less than or equal to 0.03%, Si: less than or equal to 0.8%, Cu: less than or equal to 0.50%, N: 0.24% to 0.32%, S: less than or equal to 0.02%, P: less than or equal to 0.035%, and a balance being Fe.

3. A method for manufacturing the flux-cored welding strip and the welding flux used in combination for submerged arc welding of the duplex stainless steel as claimed in claim 1, wherein the flux-cored welding strip is prepared by a process comprising the following steps:
    step 1: pickling the stainless steel shell to obtain a pickled stainless steel shell; step 2: mixing powders of raw materials for the flux core powder as claimed in claim 1 for 1 hour to 2 hours under argon protection to obtain a mixed powder, and oven-drying the mixed powder to obtain the flux core powder; and step 3: bending the pickled stainless steel shell for shaping, loading the flux core powder therein, and rolling, to obtain the flux-cored welding strip for submerged arc welding of the duplex stainless steel.

4. The method as claimed in claim 3, wherein in step 1, a solution for the pickling is an aqueous solution of 30 vol % $H_2SO_4$+17 vol % $HNO_3$+4.5 vol % HF.

5. The method as claimed in claim 3, wherein in step 2, the oven-drying is conducted at a temperature of 100° C. to 150° C. for 0.5 hour to 1 hour.

6. The flux-cored welding strip and the welding flux used in combination for submerged arc welding of the duplex stainless steel as claimed in claim 1, wherein the alloying agent in the welding flux is a W—Nb—Al—Re—La alloy that comprises W: 0.3% to 0.4%, Nb: 0.3% to 0.4%, Al: 0.3% to 0.4%, Re: 0.3% to 0.4%, and La: 0.3% to 0.4%.

7. A method for manufacturing the flux-cored welding strip and the welding flux used in combination for submerged arc welding of the duplex stainless steel as claimed in claim 1, wherein the welding flux is prepared by a process as follows: preliminarily screening raw materials for the welding flux as claimed in claim 1, then mixing by stirring, oven-drying a resulting mixture at a low temperature, adding water glass thereto, and further stirring; and granulating a resulting wet material to obtain particles for forming the welding flux, and oven-drying and sintering the particles, to obtain the welding flux for submerged arc welding of a high-manganese low-nickel duplex stainless steel.

8. The method as claimed in claim 7, wherein the sintering is conducted at a temperature of 700° C. to 800° C.

9. A use method of the flux-cored welding strip and the welding flux used in combination for submerged arc welding of the duplex stainless steel as claimed in claim 1, comprising:

using the flux-cored welding strip and the welding flux in combination, and conducting strip submerged arc cladding welding, and a deposited metal of a cladding layer after welding consists of the following chemical components: in percentages by mass, C: 0.15% to 0.25%, N: 0.30% to 0.50%, Cr: 26.0% to 27.0%, Ni: 4.0% to 5.0%, Mo: 3.5% to 4.0%, Mn: 2.45% to 2.55%, Cu: 1.4% to 1.5%, Si: 0.95% to 1.05%, W: 0.9% to 1.1%, Nb: 0.2% to 0.3%, Al: 0.3% to 0.5%, Re: 0.25% to 0.35%, La: 0.05% to 0.10%, S: less than or equal to 0.02%, P: less than or equal to 0.03%, and a balance being Fe.

10. The method as claimed in claim 3, wherein the stainless steel shell is an S32750 duplex stainless steel strip, has a thickness of 0.5 mm to 0.6 mm, and consists of: in percentages by mass, Cr: 24.0% to 26.0%, Ni: 6.0% to 8.0%, Mo: 3.0% to 5.0%, Mn: less than or equal to 1.2%, C: less than or equal to 0.03%, Si: less than or equal to 0.8%, Cu: less than or equal to 0.50%, N: 0.24% to 0.32%, S: less than or equal to 0.02%, P: less than or equal to 0.035%, and a balance being Fe.

* * * * *